United States Patent [19]

Tatsuno et al.

[11] Patent Number: 4,620,768

[45] Date of Patent: Nov. 4, 1986

[54] OPTICAL SCANNING SYSTEM

[75] Inventors: Kimio Tatsuno, Kokubunji; Keiji Kataoka, Kawagoe; Yoshifumi Homma, Hitachi; Yoshifumi Ono, Katsuta, all of Japan

[73] Assignees: Hitachi, Ltd.; Hitachi Koki Co., Ltd., both of Tokyo, Japan

[21] Appl. No.: 494,076

[22] Filed: May 12, 1983

[30] Foreign Application Priority Data

May 19, 1982 [JP] Japan ................................. 57-83083

[51] Int. Cl.⁴ ......................... G02B 27/17; G02B 7/02
[52] U.S. Cl. ....................................... 350/6.8; 350/412
[58] Field of Search ................. 350/6.8, 433, 434, 412

[56] References Cited

U.S. PATENT DOCUMENTS 4,379,612  4/1983  Matsuoka et al. ................... 350/6.8
4,496,209  1/1985  Itoh et al. ............................ 350/412

FOREIGN PATENT DOCUMENTS 1154656  9/1963  Fed. Rep. of Germany .
2911528  9/1979  Fed. Rep. of Germany .

OTHER PUBLICATIONS

Schröder, "Technische Optik", Vogel-Verlag, 9/1977, pp. 53-54.
Seiscor Industrial Products Section, "Toroidal Cylindrical Lens", 3/68, pp. 1-2.

Primary Examiner—John K. Corbin
Assistant Examiner—Rebecca D. Gass
Attorney, Agent, or Firm—Antonelli, Terry & Wands

[57] ABSTRACT

An optical scanning system wherein a light beam from a laser source is reflected by a rotating polygonal mirror and focused by a scanning lens into a scanning beam spot on the drum surface. A cylindrical lens disposed between the scanning lens and the drum for correcting the unevenness of the scanning line pitch caused by the incline of the each facet of the polygonal mirror has a curvature in the scanning direction of the beam so that optimal focal points of the scanning beam spot align on a straight line.

9 Claims, 7 Drawing Figures

OPTICAL SCANNING SYSTEM

BACKGROUND OF THE INVENTION

The present invention relates to an optical scanning system and, particularly, to an optical system suitable for use in laser beam printers and laser beam scanners.

Conventionally, in producing a scanning light beam by means of a scanning mirror such as a polygonal mirror and galvanomirror, the unevenness of the scanning pitch due to the incline of the scanning mirror is corrected by placing a cylindrical lens shaped longitudinally in the scanning direction at a position distant from the specified scanning points or surface by the focal length of the lens, so that the beam shift from the regular line to be scanned is alleviated.

This method, however, causes a "curvature of field" that is when the beam is at the central position of the scanning surface, the spot is in sharp focus but at the edges it will have a different distance from the scanning surface at the central portion and end portions of the cylindrical lens. Particularly, as the scanning beam is made to have a smaller spot diameter in order to enhance the resolving power, the focal depth becomes smaller and the variation in the spot diameter on the scanning surface increases. This causes a phenomenon, for example, that when the spot is focused correctly at the center of the scanning surface, it is defocused at the end portions on the same scanning line, resulting disadvantageously in the failure of uniformity of the resolving power.

SUMMARY OF THE INVENTION

It is an object of the present invention to provide an optical scanning system which overcomes the deficiencies of the prior art optical scanning system and achieves a uniform scanning spot in the entire scanning range.

A curved cylindrical lens is used so that the focal points of the scanning beams align on a straight line, thereby correcting the curvature of field which would be created by the conventional cylindrical lens, whereby a constant spot size can be obtained in the entire scanning range.

BRIEF DESCRIPTION OF THE DRAWINGS

FIG. 2 is a diagram explaining the scanning beam affected by cylindrical lens, FIG. 3 is a side view of the lens vs. beam relationship shown in FIG. 2, FIGS. 4 and 5 are diagrams explaining the curvature of field for the cases of a large focal depth and a small focal depth, respectively;

DESCRIPTION OF THE PREFERRED EMBODIMENTS

Figure 1:
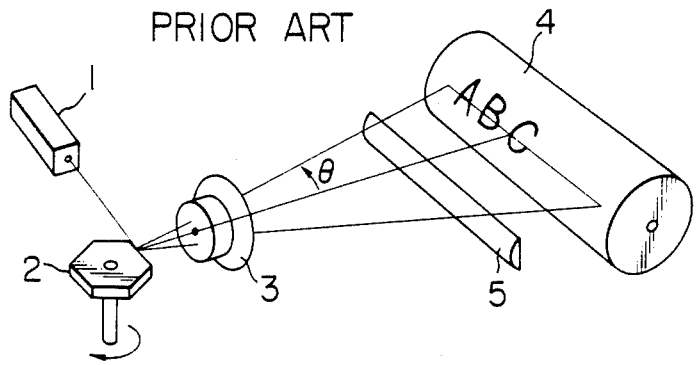
FIG. 1 is an illustration explaining the arrangement of the conventional optical scanning system.

Some optical systems will be first described utilizing FIGS. 1 to 5. In FIG. 1 showing in brief the arrangement of the conventional laser printer, a laser source 1 produces a laser beam, which is reflected by a polygonal mirror 2 (rotating in the direction shown by the arrow) and focused by a scanning lens 3 to form a light spot on the surface of a drum 4. Between the scanning lens 3 and the drum 4, a cylindrical lens 5 dimensioned longitudinally in the scanning direction is provided and it serves to correct the unevenness of the scanning line pitch on the drum surface caused by the incline of each facet of the polygonal mirror as mentioned previously. However, the arrangement of using a cylindrical lens creates a new problem, i.e., the curvature of field. This phenomenon will now be described in connection with FIG. 2.

Figure 2:
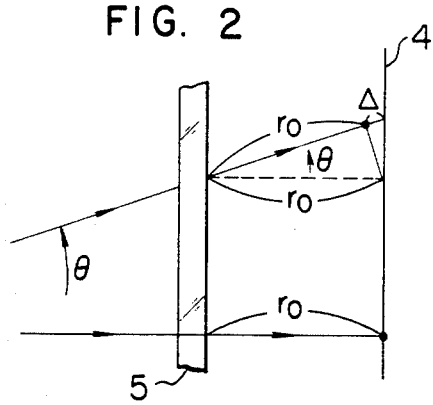
FIGS. 2 to 5 are diagrams for explaining some preparatory works to make this invention.
Figure 3:
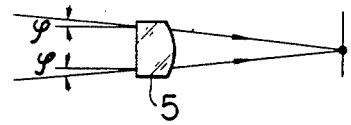

The commonly used cylindrical lens is lineshaped, and therefore, as the scanning angle $\theta$ of the beam increases from the center of a scanning, the distance from the cylindrical lens 5, along the beam axis to the drum surface 4 increases, i.e., from $r_o$ to $r_o + \Delta$ as shown in FIG. 2. On the other hand, viewing from the lateral direction, the scanning beam on the cylindrical lens has a constant incident angle $\phi$ (normally $\phi = 0$) for the scanning operation in a plane perpendicular to the scanning surface as shown in FIG. 3. On this account, the optimal focal point for a large scanning angle $\theta$ is shifted out of the scanning surface toward the cylindrical lens. In general, the image surface is formed by tracing optimal focal points, and thus the shift in focal points results in the curvature of the image surface.

Figure 4:
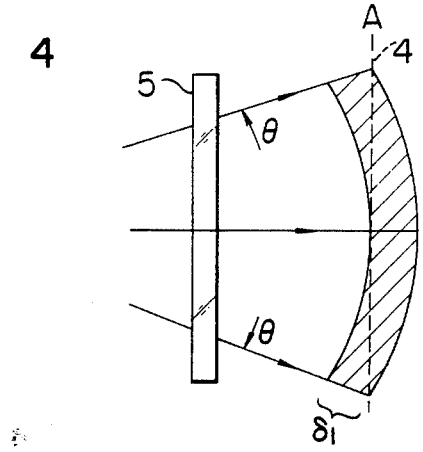

Such adverse effects of the curved image surface will be described in more detail. FIG. 4 shows the case where the scanning beam makes a relatively large spot, and thus the focal depth is large ($\delta_1$). In this case, when the scanning line is set to position A, all focal points produced by arbitrary scanning angles are included within the range of focal depth, and the variation in the spot size in the scanning range will be small. Even in this case, however, the curved image surface allows less mechanical tolerance to the deviation of the scanning line in the optical axial direction, and much severe accuracy in positioning the drum is required.

Figure 5:
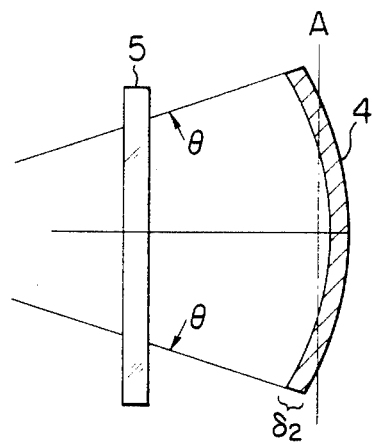

FIG. 5 shows the case where the beam spot is made smaller for enhancing the resolving power. In this case, the focal depth is small ($\delta_2$), resulting in a significant effect of the curved image surface, and a constant beam spot on the whole scanning line can no longer be obtained by choosing any scanning line A.

Figure 6:
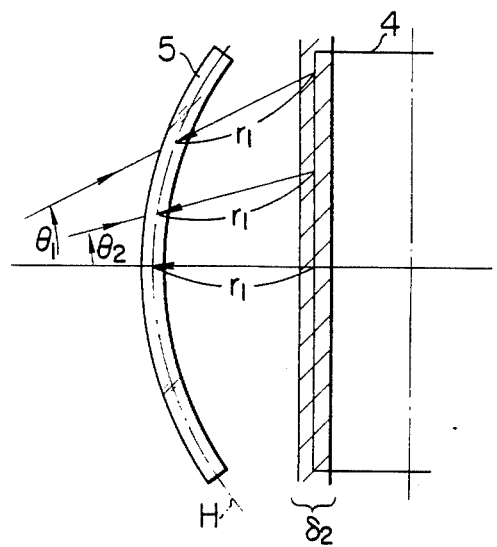
FIG. 6 is a diagram showing the arrangement embodying the inventive optical scanning system.

The present invention contemplates to provide a constant beam spot diameter over the entire scanning range by provision of a curved cylindrical lens so that the image surface, i.e., the trace of the optimal focal points is formed in a straight line. The cylindrical lens according to an embodiment of the invention is shaped in a curve so that the distance $r_1$ on an arbitrary beam axis measured from the cylindrical lens to the drum surface is substantially constant as shown in FIG. 6.

As shown in FIG. 2, the shift $\Delta$ in the focal image is found as:

$$\Delta = r_o \left( \frac{1}{\cos \theta} - 1 \right) \quad (1)$$

where $\theta$ is the scanning angle.

Figure 7:
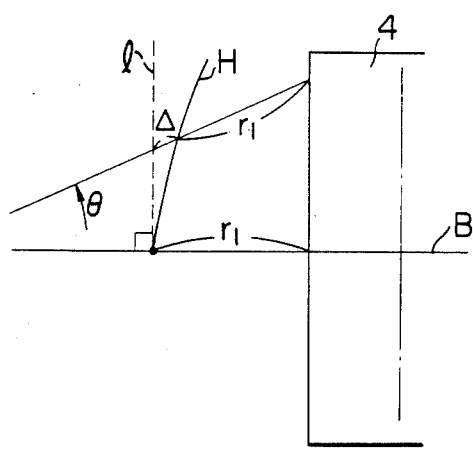
FIG. 7 is a diagram explaining a desired curve of the cylindrical lens.

Accordingly, referring to FIG. 7, by curving the cylindrical lens in accordance with Equation (1), a straight scanning line is obtained. That is, the principal plane position H of the cylindrical lens is shifted from the dashed line 1 toward the drum surface 4 by a distance $\Delta$ determined by Equation (1) along each beam path. The line 1 is perpendicular to the center beam axis B at the center of the scanning range. In case $r_1 = 60$ mm and $\theta = 13°$, for example, the maximum shift value is $\Delta = 1.6$ mm.

The curve given by Equation (1) is not circular, but it can be realized by machining a metallic, e.g., aluminum, support under numerical control referring to Equation (1) and press-fitting a plastic cylindrical lens onto the support. For simplifying the numerical control, it is also possible to calculate the radii of circles approximating the curve given by Equation (1).

As described above, the scanning surface without the curvature of field can be achieved and a constant spot diameter in arbitrary scanning direction can be obtained even for a small focal depth in a high-resolution optical scanning system. By application of the present invention, a laser beam printer performs higher quality printing, and a laser beam scanner performs scanning on the scanning surface with the higher resolution.

We claim:

1. An optical scanning system having means for reflecting a light beam by a rotating polygonal mirror to produce a scanning light beam, lens means for focusing said light beam onto a scanning surface, and a cylindrical lens disposed between said scanning surface and said focusing lens means, said cylindrical lens having a curvature in the scanning direction of said light beam with a concave side of said cylindrical lens facing said scanning surface to provide a substantially constant path of said light beam as measured from said cylindrical lens to said scanning surface wherein the unevenness of the scanning pitch due to an incline of each facet of mirrors of said polygonal mirror is corrected by said curved cylindrical lens.

2. An optical scanning system according to claim 1, wherein said cylindrical lens is made of plastic.

3. An optical scanning system according to claim 1, wherein said cylindrical lens has a refractive power only in a direction perpendicular to the scanning direction and receives through said focusing lens means said light beam parallel with a plane perpendicular to the scanning direction, said cylindrical lens having a curvature which satisfies the equation for a positional shift of the image $\Delta$:

$$\Delta = r_o \left( \frac{1}{\cos \theta} - 1 \right)$$

where $r_o$ represents a distance between the cylindrical lens and the scanning surface, and $\theta$ represents a scanning angle of said light beam.

4. An optical scanning system according to claim 2, wherein said cylindrical lens is a plastic cylindrical lens press-fitted by a support to have said curvature represented by said equation.

5. An optical scanning system comprising:
 means for reflecting a light beam by a rotating polygonal mirror to produce a scanning light beam,
 lens means for focusing said light beam onto a scanning surface, and
 a cylindrical lens having an refractive power only in a direction perpendicular to the scanning direction of said light beam and being disposed between said scanning surface and said focusing lens means for correcting the unevenness of an incline of each facet of the rotating polygonal mirror, said cylindrical lens having a curvature in accordance with the equation of $$\Delta = r_o \left( \frac{1}{\cos \theta} - 1 \right)$$

where $r_o$ represents a distance between said cylindrical lens and said scanning surface, $\theta$ represents a scanning angle of said light beam and $\Delta$ represents a shift of said curvature, the curvature of said cylindrical lens being such that the distance on an arbitrary path of said light beam measured from said cylindrical lens to said scanning surface is substantially constant.

6. An optical scanning system according to claim 5, wherein said cylindrical lens is a plastic cylindrical lens press-fitted by a support to have said curvature represented by said equation.

7. An optical scanning system comprising:
 means for reflecting a light beam by a rotating polygonal mirror to produce a scanning light beam,
 lens means for focusing said light beam to produce a light beam substantially parallel with a plane perpendicular to the scanning direction of a scanning surface, and
 a cylindrical lens having a refractive power only in a direction perpendicular to the scanning direction of said light beam, said cylindrical lens having a curvature with a concave side thereof facing said scanning surface to provide a substantially constant path of said light beam from said cylindrical lens to said scanning surface, said cylindrical lens being disposed at a position spaced by a distance of the focal length of said cylindrical lens from said scanning surface toward said focusing lens means, said cylindrical lens receiving said parallel light beam.

8. An optical scanning system according to claim 7, wherein said cylindrical lens has a curvature in accordance with the equation of $$\Delta = r_o \left( \frac{1}{\cos \theta} - 1 \right)$$

where $r_o$ represents a distance between said cylindrical lens and said scanning surface.

9. An optical scanning system according to claim 8, wherein said cylindrical lens is a plastic cylindrical lens press-fitted by a support to have said curvature represented by said equation.

* * * * *